US011762338B2

(12) United States Patent
Charbon

(10) Patent No.: US 11,762,338 B2
(45) Date of Patent: Sep. 19, 2023

(54) NON-MAGNETIC WATCH COMPONENT WITH IMPROVED WEAR RESISTANCE

(71) Applicant: Nivarox-FAR S.A., Le Locle (CH)

(72) Inventor: Christian Charbon, Chézard-St-Martin (CH)

(73) Assignee: Nivarox-FAR S.A., Le Locle (CH)

( * ) Notice: Subject to any disclaimer, the term of this patent is extended or adjusted under 35 U.S.C. 154(b) by 170 days.

(21) Appl. No.: 17/142,576

(22) Filed: Jan. 6, 2021

(65) Prior Publication Data
US 2021/0302914 A1 Sep. 30, 2021

(30) Foreign Application Priority Data
Mar. 26, 2020 (EP) ..................................... 20165964

(51) Int. Cl.
| | | |
|---|---|---|
| G04B 43/00 | (2006.01) | |
| C22F 1/08 | (2006.01) | |
| G04B 37/22 | (2006.01) | |
| G04D 3/00 | (2006.01) | |
| B32B 15/01 | (2006.01) | |
| C22C 9/06 | (2006.01) | |

(52) U.S. Cl.
CPC ............ *G04B 43/007* (2013.01); *B32B 15/01* (2013.01); *C22F 1/08* (2013.01); *G04B 37/22* (2013.01); *G04D 3/0076* (2013.01); *G04D 3/0079* (2013.01); *C22C 9/06* (2013.01); *Y10T 428/1291* (2015.01)

(58) Field of Classification Search
None
See application file for complete search history.

(56) References Cited

U.S. PATENT DOCUMENTS

| | | | | | |
|---|---|---|---|---|---|
| 4,411,762 | A | * | 10/1983 | Kline | ...................... C25B 11/04 204/290.01 |
| 5,310,602 | A | * | 5/1994 | Li | ...................... H01L 21/76867 428/209 |
| 6,022,808 | A | * | 2/2000 | Nogami | ............ H01L 23/53233 257/E21.585 |
| 2012/0068667 | A1 | * | 3/2012 | Friesen | ................. H01M 12/08 429/432 |
| 2018/0024502 | A1 | | 1/2018 | Fussinger et al. | |

FOREIGN PATENT DOCUMENTS

| | | |
|---|---|---|
| EP | 1 241 539 A1 | 9/2002 |
| EP | 3 273 304 A1 | 1/2018 |
| EP | 3 502 288 A1 | 6/2019 |

(Continued)

OTHER PUBLICATIONS

Wong et al., "Corrosion behavior of laser-alloyed copper with titanium fabricated by high power diode laser", Dec. 27, 2011, Corrosion Science, vol. 57, pp. 228-240. (Year: 2011).*

(Continued)

*Primary Examiner* — Xiaobei Wang
(74) *Attorney, Agent, or Firm* — Sughrue Mion, PLLC

(57) ABSTRACT

A non-magnetic watch component (1) comprising a substrate (4) made of a copper alloy, wherein at least one part of the substrate (4) has a surface layer (5) including $Cu_xTi_y$ intermetallics, and a method for manufacturing this watch component.

16 Claims, 1 Drawing Sheet

(56) References Cited

FOREIGN PATENT DOCUMENTS

EP 3 591 099 A1 1/2020
EP 3 626 855 A1 3/2020

OTHER PUBLICATIONS

Zhu et al., "Surface Modification of C17200 Copper-Beryllium Alloy by Plasma Nitriding of Cu—Ti Gradient Film", Jan. 29, 2018, J. of Materials Engineering and Performance, vol. 27(3), pp. 961-969. (Year: 2018).*
Uzunov et al., "Thin films of intermetallic Cu/Ti compounds and their possible uses", 1999, Vacuum, vol. 52, pp. 321-325. (Year: 1999).*
Martin N. Wilson, "Advances in Low Loss NBTI Strand and Cable", WAMSDO Proceedings, Geneva, Switzerland, Jan. 1, 2009, pp. 8-12, XP009139537.
European Search Report for EP 20 16 5964 dated Sep. 18, 2020.
Communication dated Aug. 31, 2021 by the Russian Patent Office in Russian Application No. 2021107638.
M. Reza Bateni et al., "The Effect of Novel Ti—Cu Intermetallic Compound Coatings on Tribological Properties of Copper", National Tribology Conference, Sep. 2003, pp. 55-62 ( 8 pages total).
N.E. Cherenda et al., "Tribological Properties of Copper Alloyed With Titanium Atoms Under the Action of Compression Plasma Flows", 10th International Conference "Interaction of Radiation with a Solid", Sep. 2013, section 3, pp. 226-228 ( 3 pages total).

* cited by examiner

NON-MAGNETIC WATCH COMPONENT WITH IMPROVED WEAR RESISTANCE

CROSS-REFERENCE TO RELATED APPLICATIONS

This application claims priority to European Patent Application No. 20165964.6 filed Mar. 26, 2020, the entire contents of which are incorporated herein by reference.

FIELD OF THE INVENTION

The invention relates to a non-magnetic watch component intended for the movement or external watch parts and to the method for manufacturing the same.

BACKGROUND OF THE INVENTION

Hard and non-ferromagnetic metal alloys find application in numerous fields, mainly for components subjected to high mechanical and/or tribological stresses and required to remain insensitive to magnetic fields. This is notably the case for numerous watch components, such as, for example, wheels, pinions, arbors or springs in the movement. For the external watch parts, it is also advantageous to obtain high hardnesses, for example for the case middle, the bezel, the case back or the crown. Indeed, a high hardness generally makes it possible to obtain improved scratch and wear resistance and therefore good durability of these components exposed to the external environment.

In metallurgy, various mechanisms make it possible to harden alloys, depending on their chemical compositions and their thermomechanical histories. Thus, the following are known: solid solution hardening, structural hardening, strain hardening, martensitic transformation in steels, spinodal decomposition, and grain-boundary strengthening (Hall-Petch). In the most remarkable alloys, several of these hardening mechanisms are used simultaneously. However, non-ferromagnetic alloys which have hardnesses of more than 500 HV are rare. Further, such alloys are difficult to machine and almost impossible to deform, due to their very high hardness and their very low ductility.

There is known from EP Patent No. 3273304 a watch component, and more particularly a pivot arbor, comprising at least one part made of a non-magnetic copper alloy containing between 10 and 20% by weight of Ni and between 6 and 12% of Sn. This alloy has a low intrinsic hardness of around 350 HV. In order to increase hardness, the external surface of the component is hardened by the diffusion of atoms or by depositing a layer of TiN, of diamond, etc., or by an ion implantation process.

To date, there is still a need for new non-magnetic watch components having improved wear resistance, and, depending on the type of component, if appropriate, also better tribological properties.

SUMMARY OF THE INVENTION

It is an object of the present invention to propose a watch component which makes it possible both to limit sensitivity to magnetic fields and to obtain an improve hardness compatible with the wear and shock resistance requirements in the watchmaking field while offering better tribological properties for components such as pivot arbors, wheels, etc.

To this end, the invention relates to a watch component intended for the movement or external watch parts comprising a substrate made of a copper alloy, with at least one part of the substrate having a surface layer of $Cu_xTi_y$ intermetallics. This component combines the advantages of the non-magnetic copper alloy and the hardness of the outer intermetallic layer for the most used parts with the result that wear resistance is improved. Further, the presence of the intermetallic surface layer reduces the friction coefficient during use.

The present invention also relates to the method of manufacturing said component, which includes the following steps:

a) Providing a substrate made of a copper alloy, wherein at least one part of said substrate already substantially has the final shape of the non-magnetic watch component, b) Depositing a titanium layer on said part of the substrate, c) Heat treating to diffuse the titanium in the copper alloy to form a layer of $Cu_xTi_y$ intermetallics on said part, This diffusion treatment makes it possible to obtain a hard outer layer which adheres perfectly to the substrate. Indeed, the intermetallic layer forms a layer which is continuous with the substrate owing to the diffusion of titanium in the copper alloy of the substrate.

BRIEF DESCRIPTION OF THE DRAWINGS

Other features and advantages will appear clearly from the following description, given by way of non-limiting illustration, with reference to the annexed drawings, in which.

DESCRIPTION OF THE INVENTION

In the present description, the term "non-magnetic" alloy means a paramagnetic or diamagnetic or antiferromagnetic alloy, whose magnetic permeability is less than or equal to 1.01.

The invention relates to a watch component intended for the movement or the external watch parts. Thus, it may be an external component chosen from the non-exhaustive list including a case middle, a case back, a bezel, a pusher, a bracelet link, a bracelet or strap, a buckle and a crown. For the movement, the non-exhaustive list may include a pallet plate, a wheel plate, a gear train, an arbor, a pallet-staff and a pinion. More specifically, the watch component can be a pivot arbor with at least one part of said arbor, such as a pivot, a screw, a winding stem or a balance spring stud having improved wear resistance and tribological properties owing to the method of the invention.

Figure 1:
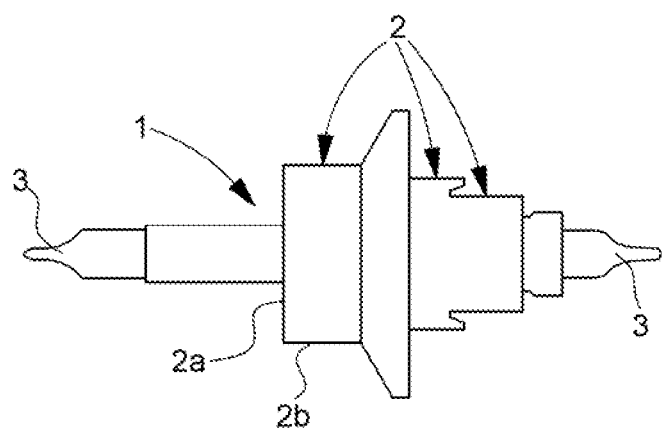
FIG. 1 is a representation of a timepiece component, and more precisely of a balance staff, according to the invention.

The invention will be described below in the context of application to a non-magnetic balance staff, generally referenced 1 for a watch component, as represented in FIG. 1. Parts of this type have a body with a diameter of less than 2 mm, and pivots with a diameter of less than 0.2 mm, with a precision of a few microns.

Referring to FIG. 1, there is shown a balance staff 1 according to the invention, which comprises a plurality of sections 2 of different diameters, preferably formed by bar turning or any other chip removal machining technique, and conventionally defining bearing surfaces 2a and shoulders 2b arranged between two end portions defining two pivots 3.

These pivots are each intended to pivot in a bearing, typically in an orifice of a jewel or ruby.

Figure 2:
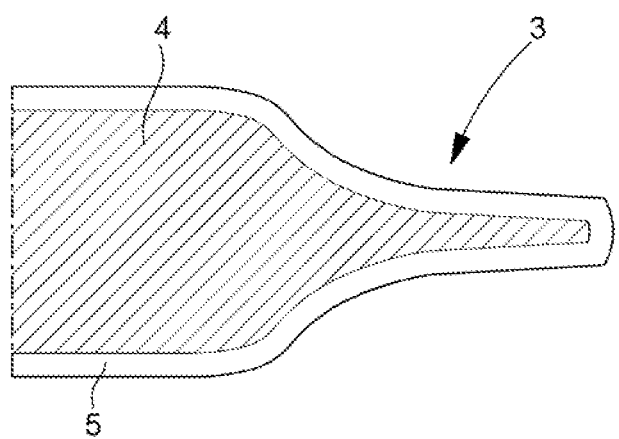
FIG. 2 is a partial sectional view of one of the pivots of the arbor of FIG. 1 coated with an outer layer of intermetallics.

According to the invention and as represented in FIG. 2, at least one part of watch component 1, and, in the illustrated example, at least one pivot 3, is formed of a substrate 4 made of a non-magnetic metal alloy in order to limit its sensitivity to magnetic fields. This alloy is any copper alloy such as, for example, a CuNi, CuSn, CuZn, CuNiZn, CuNiSn, CuAl, CuAlNi, CuAlNiFe, CuBe or CuBePb alloy. More specifically, again by way of example, one can choose a CuNi15Sn8, CuNi9Sn6 or CuNi7.5Sn5 alloy from among CuNiSn and CuBe2 alloys or CuBe2Pb from among CuBe alloys. According to the invention, at least one part of substrate 4 has a surface layer of $Cu_xTi_y$ intermetallics referenced 5. This intermetallic layer contains one or more of the following compounds: $Cu_4Ti$, $Cu_2Ti$, $CuTi$, $Cu_3Ti_2$, $CuTi_2$, $Cu_4Ti_3$. It has a thickness comprised between 20 nm and 10 μm and preferably between 500 nm and 2.5 μm.

According to the invention, the intermetallic layer has a hardness $HV_{0.01}$ (10 g load) greater than 400 $HV_{0.01}$ and preferably greater than 500 $HV_{0.01}$. The substrate itself has a hardness less than or equal to 400 $HV_{0.01}$.

The method of manufacturing the watch component of the invention includes the following steps:

Providing the substrate made of copper alloy (Cu) with at least one part of said substrate already substantially having the final shape of the watch component, Depositing a layer of titanium (Ti) on said part, Carrying out a diffusion heat treatment to transform at least partially said titanium layer into a layer of $Cu_xTi_y$ intermetallics.

According to the invention, the substrate can be made by any suitable technique: casting, rolling, powder metallurgy, additive manufacturing, etc., followed, if required for sizing, by a machining operation. It can be fully sized before the titanium layer is deposited. It is also possible for only one part of the substrate to be sized prior to the deposition of the titanium layer and for the rest of the component to be sized after the diffusion heat treatment. More specifically for a balance staff, at least the pivot is sized by bar turning or any other chip removal machining technique from copper alloy bars with a diameter of less than 3 mm and preferably less than 2 mm prior to the deposition of the titanium layer.

The titanium layer can be added around the substrate by galvanic means, PVD, CVD, ALD, or any other suitable process. The deposited layer has a thickness comprised between 20 nm and 10 μm, and preferably between 500 nm and 2.5 μm. The diffusion heat treatment is carried out in a range of temperatures comprised between 600 and 900° C. for a time comprised between 30 minutes and 10 hours, and preferably between 1 and 6 hours. According to a variant of the invention, the whole titanium layer is transformed to intermetallics. According to another variant of the invention, the titanium layer is only partially transformed to intermetallics, with a layer of titanium thus remaining around the intermetallic layer. This residual titanium layer has a thickness comprised between 1 nm and 5 μm. It may be kept on the final product or removed by selective chemical etching or polishing.

The method may also include a heat treatment for volume hardening of the substrate, such as, for example, spinodal decomposition hardening for CuNiSn family alloys or structural hardening for CuBe family alloys, in a range of temperatures comprised between 300 and 500° C., preferably between 320° C. and 450° C., for a time comprised between 30 minutes and 3 hours, more particularly between 30 minutes and 1 hour 30 minutes. The hardening heat treatment first requires high temperature dissolution of the elements involved in the hardening, Ni and Sn for a CuNiSn alloy or Be for a CuBe or CuBePb alloy, followed by quenching to maintain in solution the elements before carrying out the hardening heat treatment. According to the invention, the diffusion heat treatment between 600 and 900° can be used to carry out the dissolution. By way of example, for a CuBe2Pb alloy, the Ti diffusion and Be dissolution treatment is carried out at 800° C., the substrate is then rapidly cooled to a temperature below 200° C. before being treated at 325° C. for 3 hours for the precipitation of CuBe2. Generally, the manufacturing method thus includes, after the titanium layer deposition step, the steps of:

Heat treating to diffuse the Ti and dissolve, for example, Ni and Sn for a CuNiSn alloy or Be for a CuBe or CuBePb alloy, at a temperature comprised between 600 and 900° C. for a time comprised between 30 minutes and 10 hours and preferably between 1 and 6 hours.

Quenching to a temperature below 200° C.

Carrying out a hardening heat treatment at a temperature comprised between 300 and 500° C., preferably between 320 and 450° C., for a time comprised between 30 minutes and 3 hours and preferably between 30 and 90 minutes.

The manufacturing method can be finalised after the surface diffusion heat treatment or volume hardening treatment as appropriate, by a surface finish step such as polishing or rolling.

The invention claimed is:

1. A non-magnetic watch component (1) comprising a substrate (4) made of a copper alloy, wherein at least one part of the substrate (4) comprises a surface layer (5) including $Cu_xTi_y$ intermetallics,
   wherein the surface layer (5) has on the outer surface thereof a residual layer of titanium,
   wherein the residual titanium layer has a thickness of between 1 nm and 5 μm, and
   wherein the component is chosen from the group including a pallet plate, a wheel plate, a gear train, an arbor, a pallet staff and a pinion.

2. The non-magnetic watch component (1) according to claim 1, wherein the copper alloy is chosen from the group including the alloys CuNi, CuSn, CuZn, CuNiZn, CuNiSn, CuBe, CuBePb, CuAl, CuAlNi and CuAlNiFe.

3. The non-magnetic watch component (1) according to claim 1, wherein the surface layer (5) has a thickness of between 20 nm and 10 microns.

4. The non-magnetic watch component (1) according to claim 1, wherein the surface layer (5) has a hardness of more than 400 $HV_{0.01}$.

5. The non-magnetic watch component (1) according to claim 1, wherein the surface layer (5) includes one or more compounds chosen from the group including $Cu_4Ti$, $Cu_2Ti$, $CuTi$, $Cu_3Ti_2$, $CuTi_2$ and $Cu_4Ti_3$.

6. The non-magnetic watch component (1) according to claim 1, wherein the component is a component of movement or a component of external watch parts.

7. A non-magnetic watch component (1) comprising a substrate (4) made of a copper alloy, wherein at least one part of the substrate (4) comprises a surface layer (5) including $Cu_xTi_y$ intermetallics,
   wherein the surface layer (5) has on the outer surface thereof a residual layer of titanium,
   wherein the residual titanium layer has a thickness of between 1 nm and 5 μm, and wherein the component consists of a pivot arbor, a part being a pivot (3), a screw, a winding stem or a balance spring stud.

8. A method for manufacturing the non-magnetic watch component (1) according to claim 1 including the following steps:
- a) providing a substrate (4) made of a copper alloy, wherein at least one part of said substrate (4) already substantially has a final shape of the non-magnetic watch component (1),
- b) depositing a titanium layer on said part of the substrate (4),
- c) heat treating to diffuse the titanium in the copper alloy to form a layer of $Cu_xTi_y$ intermetallics on said part.

9. The manufacturing method according to claim 8, wherein the diffusion heat treatment is carried out at a temperature comprised between 600° C. and 900° C. for a time comprised between 30 minutes and 10 hours.

10. The manufacturing method according to claim 8, wherein the substrate (4) is manufactured by casting, rolling, powder metallurgy, or additive manufacturing, optionally followed by a machining operation.

11. The manufacturing method according to claim 8, wherein the titanium layer is deposited by galvanic means, by PVD, by ALD, or by CVD.

12. The manufacturing method according to claim 8, wherein the deposited titanium layer has a thickness comprised between 20 nm and 10 μm.

13. The manufacturing method according to claim 8, wherein the method includes a heat treatment step of volume hardening the substrate (4) carried out at a temperature comprised between 300 and 500° C. for a time comprised between 30 minutes and 3 hours, said volume hardening heat treatment step being carried out after step c).

14. The manufacturing method according to claim 13, wherein the method includes a step of quenching to a temperature below 200° C. between the diffusion heat treatment step c) and the volume hardening heat treatment step.

15. The manufacturing method according to claim 14, wherein the diffusion heat treatment step c) dissolves Ni and Sn for a CuNiSn alloy or Be for a CuBe or CuBePb alloy.

16. A method for manufacturing the non-magnetic watch component (1) according to claim 7 including the following steps:
- a) providing a substrate (4) made of a copper alloy, wherein at least one part of said substrate (4) already substantially has a final shape of the non-magnetic watch component (1),
- b) depositing a titanium layer on said part of the substrate (4),
- c) heat treating to diffuse the titanium in the copper alloy to form a layer of $Cu_xTi_y$ intermetallics on said part.

* * * * *